Figure 1:
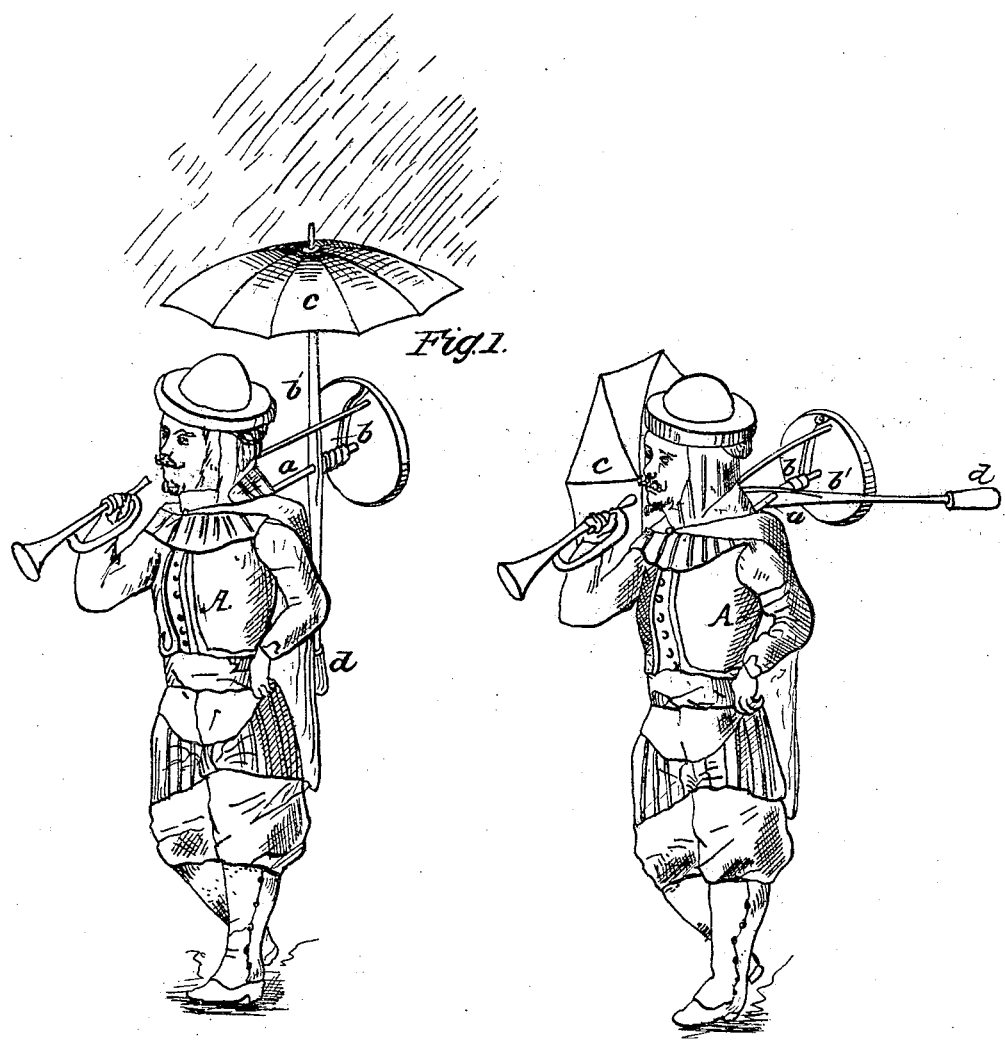

A. C. RAND.
Weather Prophet.

No. 51,477. Patented Dec. 12, 1865.

UNITED STATES PATENT OFFICE.

A. C. RAND, OF UNION MILLS, PENNSYLVANIA.

IMPROVEMENT IN WEATHER-PROPHETS.

Specification forming part of Letters Patent No. 51,477, dated December 12, 1865.

*To all whom it may concern:*

Be it known that I, A. C. RAND, of Union Mills, in the county of Erie and State of Pennsylvania, have invented a new and Improved Weather-Prophet; and I do hereby declare that the following is a full, clear, and exact description thereof, which will enable others skilled in the art to make and use the same, reference being had to the accompanying drawings, forming part of this specification, in which—

Figure 1 represents a perspective view of my invention in the position which it assumes when the atmosphere is wet. Fig. 2 is a similar view of the same in the position it assumes when the weather is dry.

Similar letters of reference indicate like parts.

This invention consists in the application to a human figure of the seed of a hygrometer-plant, in combination with a miniature umbrella, which is connected to said seed and to the figure in such a manner that when the atmosphere is dry the umbrella is turned down to the side of the figure, and when the atmosphere is wet the umbrella is turned up over the head of the figure, and by these means the state of the weather is indicated in a reliable manner.

A represents a human figure made of wood, papier-maché, metal, or any other suitable material of any desirable form or shape, and placed in an upright position, ready to take a walk. From the back of this figure extends a stud, $a$, which forms the guide for the seed $b$ of a hygrometer-plant.

All seeds of geraniums and of other plants which grow in the form of small coils have the property to wind up when they are exposed to moisture and to unwind as they become dry. One end of the coil of this seed I attach to the stud $a$ or to some portion of the figure A, and the other end is secured to the staff $b'$. This staff is perforated with a transverse hole at about the center of its length, and one end of the same bears the umbrella C, while the other end supports the balance-weight $d$. By this arrangement the umbrella turns on the stud $a$ with the smallest possible amount of power, so that the seed $b$, as it winds and unwinds, is able to impart motion to the same.

It is obvious that the stud $a$ and seed $b$ might be concealed within the body of the figure, and I do not wish to confine myself to the precise arrangement of parts shown in the drawings, but reserve a right to make such alterations in the shape of the figure and in the connections as I may find to be desirable.

By the action of the seed the umbrella is turned down to the side of the figure when the atmosphere is dry and raised over the head of the figure when the atmosphere becomes moist, and the state of the weather is thereby indicated.

I am aware that the expansion and contraction of a catgut by the changes of the atmosphere have been employed to change the position of a cap over the head of a human figure—viz., to turn said cap up when the air is moist and to turn the cap down when the atmosphere is dry. This device, however, is not at all reliable. The catgut soon stretches and does not return the cap to the desired place, and the correct operation is disturbed.

The action of the seed in my device is perfectly reliable, and it never fails to turn up the umbrella if the atmosphere is charged with a surplus quantity of moisture.

If desired, the staff of the umbrella might be passed down through the head of the figure and made to rotate with the umbrella by the action of the seed. In that case the word "rain" on one side of the umbrella would indicate a wet and the word "fine," on the other side a dry state of the atmosphere.

Having thus described my invention, I claim as new and desire to secure by Letters Patent—

The use of the seed $a$ of a hygrometer-plant, in combination with the umbrella C and figure A, arranged and operating substantially as and for the purpose herein shown and described.

A. C. RAND.

Witnesses:
M. M. LIVINGSTON,
J. F. BUCKLEY.